(12) United States Patent
Nasis

(10) Patent No.: US 12,072,117 B2
(45) Date of Patent: Aug. 27, 2024

(54) ENVIRONMENT MANAGEMENT SYSTEMS AND METHODS

(71) Applicant: AIRTHINX, INC, Philadelphia, PA (US)

(72) Inventor: Vasileios Nasis, Philadelphia, PA (US)

(73) Assignee: AIRTHINX, INC, Philadelphia, PA (US)

( * ) Notice: Subject to any disclaimer, the term of this patent is extended or adjusted under 35 U.S.C. 154(b) by 0 days.

(21) Appl. No.: 17/478,606

(22) Filed: Sep. 17, 2021

(65) Prior Publication Data

US 2023/0089131 A1 Mar. 23, 2023

(51) Int. Cl.
| | |
|---|---|
| *F24F 11/65* | (2018.01) |
| *B60H 3/00* | (2006.01) |
| *B66B 5/00* | (2006.01) |
| *B66B 11/02* | (2006.01) |
| *F24F 8/10* | (2021.01) |

(Continued)

(52) U.S. Cl.
CPC ............... *F24F 11/65* (2018.01); *B60H 3/00* (2013.01); *B66B 5/0012* (2013.01); *B66B 11/024* (2013.01); *F24F 8/10* (2021.01); *F24F 8/20* (2021.01); *F24F 2110/10* (2018.01); *F24F 2110/20* (2018.01); *F24F 2110/40* (2018.01); *F24F 2110/52* (2018.01);
(Continued)

(58) Field of Classification Search
CPC .... F24F 11/65; F24F 2110/20; F24F 2110/64; F24F 2110/40; F24F 2110/10; F24F 2110/52; F24F 2110/65; F24F 2120/10; F24F 2130/40

See application file for complete search history.

(56) References Cited

U.S. PATENT DOCUMENTS 9,958,176 B2 * 5/2018 Bicknell ................. F24F 11/30
11,137,163 B2 10/2021 Nasis
(Continued)

FOREIGN PATENT DOCUMENTS

| GB | 2 563 008 A | 12/2018 |
|---|---|---|
| WO | WO-2018/091340 A1 | 5/2018 |

OTHER PUBLICATIONS

Final Office Action mailed on Feb. 1, 2021, for U.S. Appl. No. 16/931,300, filed Jul. 16, 2020, 13 pages.
(Continued)

*Primary Examiner* — Nelson J Nieves
(74) *Attorney, Agent, or Firm* — Riverside Law LLP

(57) ABSTRACT

Methods, systems, and devices for monitoring air quality and controlling air purification in an environment are described herein. The method can include receiving from a device a plurality of air quality parameters for the environment and receiving an indication representing a potential change in occupancy in the environment. In response to the indication of a potential change in occupancy, the method can include determining an air quality target that is based at least in part on at least one air quality parameter in the plurality of air quality parameters and the potential change in occupancy. The air quality parameter can be representative of the quality of air to be achieved in the environment for the change in occupancy. The method can include transmitting instructions to control purification in the environment based at least in part on the air quality target.

17 Claims, 10 Drawing Sheets

(51) Int. Cl.
   *F24F 8/20*     (2021.01)
   *F24F 110/10*   (2018.01)
   *F24F 110/20*   (2018.01)
   *F24F 110/40*   (2018.01)
   *F24F 110/52*   (2018.01)
   *F24F 110/64*   (2018.01)
   *F24F 110/65*   (2018.01)
   *F24F 120/10*   (2018.01)
   *F24F 130/40*   (2018.01)

(52) U.S. Cl.
   CPC ....... *F24F 2110/64* (2018.01); *F24F 2110/65* (2018.01); *F24F 2120/10* (2018.01); *F24F 2130/40* (2018.01)

(56) References Cited

U.S. PATENT DOCUMENTS

| | | | |
|---|---|---|---|
| 2006/0173580 A1 | 8/2006 | Desrochers et al. | |
| 2015/0032264 A1 | 1/2015 | Emmons et al. | |
| 2015/0168003 A1* | 6/2015 | Stefanski | F24F 11/70 165/268 |
| 2015/0194039 A1 | 7/2015 | Martin | |
| 2016/0066067 A1 | 3/2016 | Schultz et al. | |
| 2016/0066068 A1 | 3/2016 | Schultz et al. | |
| 2016/0116181 A1 | 4/2016 | Aultman et al. | |
| 2017/0015177 A1* | 1/2017 | Isert | B60H 1/24 |
| 2017/0130981 A1 | 5/2017 | Willette et al. | |
| 2018/0067508 A1* | 3/2018 | Brown | F24F 11/30 |
| 2018/0073759 A1 | 3/2018 | Zhang et al. | |
| 2018/0299151 A1 | 10/2018 | Ajax et al. | |
| 2018/0372355 A1* | 12/2018 | Mosamkar | B01D 53/72 |
| 2019/0077217 A1* | 3/2019 | Yu | B60H 1/00985 |
| 2019/0209806 A1* | 7/2019 | Allen | A61M 21/02 |
| 2019/0346417 A1 | 11/2019 | Benefield | |
| 2020/0117940 A1 | 4/2020 | Wang et al. | |
| 2020/0126337 A1* | 4/2020 | Friedli | G07C 9/257 |
| 2020/0141604 A1 | 5/2020 | Chen et al. | |
| 2020/0186626 A1 | 6/2020 | Martin | |
| 2020/0307950 A1* | 10/2020 | Sudi | B66B 1/2458 |
| 2020/0360858 A1* | 11/2020 | Mathur | B01D 46/0038 |
| 2021/0010701 A1* | 1/2021 | Nesler | B01D 46/58 |
| 2021/0011443 A1* | 1/2021 | McNamara | B01D 46/0028 |
| 2021/0247198 A1* | 8/2021 | Korber | E05F 15/70 |
| 2021/0393834 A1* | 12/2021 | Wellig | F24F 8/20 |
| 2022/0034540 A1* | 2/2022 | Reeves | F24F 11/49 |
| 2022/0363107 A1* | 11/2022 | Krause | B60H 1/243 |

OTHER PUBLICATIONS

International Search Report mailed on Nov. 3, 2020, for PCT Application No. PCT/US2020/042413, filed Jul. 16, 2020, 5 pages.
Non-Final Office Action mailed on Oct. 6, 2020, for U.S. Appl. No. 16/931,300, filed Jul. 16, 2020, 10 pages,.
Notice of Allowance mailed on Aug. 23, 2021, for U.S. Appl. No. 16/931,300, filed Jul. 16, 2020, 5 pages.
Written Opinion of the International Searching Authority mailed on Nov. 3, 2020, for PCT Application No. PCT/US2020/042413, filed Jul. 16, 2020, 7 pages.

* cited by examiner

ENVIRONMENT MANAGEMENT SYSTEMS AND METHODS

TECHNICAL FIELD

Devices, systems, and methods herein relate to environment management, such as environment monitoring and/or purification.

BACKGROUND

Investing in air quality management has become increasingly important. Constant and consistent monitoring of air quality in tandem with regular and controlled air purification (e.g., disinfection, filtration) can protect human health. For instance, superior air quality monitoring and purification can prevent the spread of airborne bacterial and viral organisms, and therefore, infection. This is especially true for indoor spaces that are more prone to spread bacterial and viral infections.

Conventional technologies to improve air quality in indoor spaces usually include using separate devices for air quality monitoring and purification. However, conventional devices are not able to intelligently adapt to environmental conditions, and are unable to provide optimal management of environmental conditions (e.g., air quality).

Therefore, there is an unmet need for intelligent and controlled environment management.

SUMMARY

In some variations, a method for monitoring air quality and controlling air purification in an environment may include receiving (e.g., from a device located in the environment) a plurality of air quality parameters for the environment, and receiving an indication representing a potential change in occupancy in the environment. The method may further include, in response to the indication representing the potential change in occupancy, determining, via at least one processor, an air quality target based at least in part on at least one air quality parameter in the plurality of air quality parameters and the potential change in occupancy, where the air quality target may be representative of the quality of air to be achieved in the environment for the potential change in occupancy. In some variations, the method may further include transmitting instructions to control air purification in the environment based at least in part on the air quality target.

In some variations, a device for monitoring and controlling air quality in an environment may include a housing, at least a first sensor to generate a first sensor data comprising a plurality of air quality parameters characterizing quality of air in the environment, a second sensor to generate a second sensor data comprising occupancy information for the environment, a network communication module communicably coupled to the at least first sensor and the second sensor, to transmit the first sensor data and the second sensor data over a network, and an air purification module communicably coupled to the network communication module and configured to purify air in the environment.

In some variations, a method for monitoring air quality and controlling air purification in an environment may include receiving a first sensor data comprising a plurality of air quality parameters for the environment, receiving a second sensor data comprising occupancy information for the environment, transmitting, to a cloud platform, the first sensor data and the second sensor data, receiving, from the cloud platform, instructions to control air purification in the environment, wherein the instructions are based at least in part on at least one air quality parameter in the plurality of air quality parameters and the occupancy information, and varying, an intensity of air purification based at least in part on the instructions.

DETAILED DESCRIPTION

Figure 1:
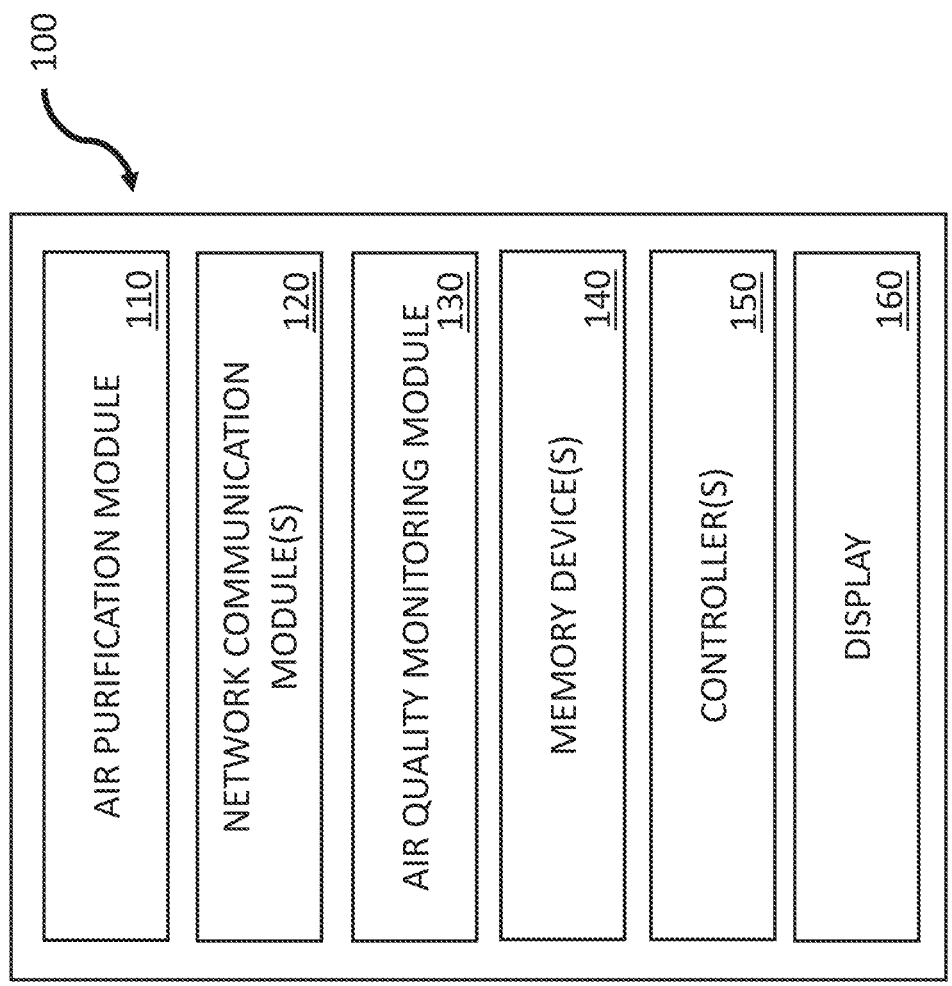
FIG. 1 is an illustrative schematic of an exemplary variation of an intelligent environment monitoring and purification device.

Non-limiting examples of various aspects and variations of the invention are described herein and illustrated in the accompanying drawings.

System, devices, and methods for intelligent environment management are described herein.

Improving and maintaining air quality in indoor and outdoor spaces is of utmost importance to human health. Poor air quality can spread airborne diseases such as infectious bacterial and viral diseases. The impact of such diseases can be devastating. For instance, some bacterial and viral diseases can cause serious respiratory and/or cardiac conditions. Presence of air pollutants in the air can trigger respiratory and inflammatory responses, such as asthma, allergies, and respiratory diseases. In some instances, long-term exposure to air pollutants may lead to cancer.

Maintaining air quality is especially difficult in indoor spaces with poor ventilation. More specifically, the air quality in indoor spaces are susceptible to constant change based on various factors such as number of people in the space, ambient air quality, humidity, temperature, and/or the like. Additionally, indoor spaces can become excessively noisy at certain times. These factors may be taken into consideration while purifying the air in indoor spaces.

For example, maintaining air quality in an environment such as a vehicle (e.g., car, bus, train, etc.) may include taking into consideration the number of occupants in that vehicle, the outdoor air quality at the location of that vehicle, and/or the humidity and temperature at the location of that vehicle, etc. Additionally, a change in occupancy can also influence the air quality within the vehicle. For example, the air quality in a vehicle may reduce with an increase in occupancy due to an increased amount of carbon dioxide, pathogens, etc. in exhaled breath by occupants.

In a similar manner, maintaining air quality in an environment such as an elevator may include taking into consideration the number of people in the elevator, motion of the elevator, etc. Furthermore, small closed spaces such as an elevator can become excessively noisy. In some variations, air purification may take the noise factor into consideration. For example, air purification may be controlled based at least in part by selectively controlling intensity of air purification (e.g., controlling fan speed, etc.) based on occupancy (e.g., anticipated occupancy). For example, an intensity of air purification may be reduced when at least a threshold number (e.g., one, two, etc.) of occupants in the environment are detected and/or anticipated. In some variations, air purification intensity may be a function of detected and/or anticipated occupancy. For example, air purification intensity decrease with increasing number of occupants (e.g., in a linear manner).

Systems, devices, and methods described herein provide intelligent air quality management and purification in closed indoor spaces by taking various factors into consideration. Some non-limiting examples of these factors include occupancy information, potential change in occupancy, ambient air quality, insights based on analytics of data collected from other similar spaces, a combination thereof, and/or the like.

Generally, variations of the technology described herein can include an intelligent environment monitoring and purification device (also referred to herein as an "environment management device") to monitor the air quality and to purify the air in an environment (e.g., an indoor space). The environment management device can be communicatively coupled to a cloud platform that collects data from multiple such environment management devices located in different spaces. The cloud platform can process this data and generate predictions using machine learning algorithms and/or by implementing artificial intelligence. These predictions can be used to transmit instructions to each environment management device to control the intensity of air purification.

Intelligent Environment Monitoring and Purification Device

FIG. 1 is an illustrative schematic of an exemplary variation of an intelligent environment monitoring and purification device 100 (also referred to herein as the "environment management device" 100). The environment management device 100 can include an air quality monitoring module 130, an air purification module 110, one or more network communication modules 120, one or more controllers 150, one or more memory devices 140, and at least one display 160, each of which can be communicably coupled to each other.

In some variations, the environmental management device 100 may be portable. For example, the environmental management device 100 may be sized and/or shaped in a standalone, compact manner. As described in further detail below, the environmental management device 100 may, for example, be configured to mount to or on a surface within a transportation environment (e.g., a vehicle such as a car, train, bus, watercraft, aircraft, or spacecraft, an elevator, etc.), such as on a wall, on furniture (e.g., back of a seat), a shelf or other dashboard, and/or the like. In some variations, the environmental management device 100 may be configured to be located in an unobstrusive space within a transportation environment. In some variations, the environmental management device 100 may be configured to mount to or on a surface within other suitable indoor environments (e.g., building).

The air quality monitoring module 130 can monitor the quality of air in an environment (e.g., indoor space such as vehicles, elevators, etc.). For instance, the air quality monitoring module 130 can include one or more sensors to generate sensor data comprising a plurality of air quality parameters that characterize the quality of air in the environment. For example, the air quality monitoring module 130 can sense the amount of particulate matter, amount of gas, temperature, humidity, pressure, etc. in an environment and generate sensor data characterizing one or more of these parameters.

In some variations, the air quality monitoring module 130 can be communicatively coupled to other sensors such as occupancy sensor, accelerometer, sound pressure sensor, infrared sensor, Global Positioning System (GPS) a combination thereof, and/or the like. In some variations, the air quality monitoring module 130 can include other sensors such as occupancy sensor (e.g., carbon dioxide sensor, where carbon dioxide measurements may be correlated to an estimated number of occupants), accelerometer, sound pressure sensor, infrared sensor, GPS, a combination thereof, and/or the like. In some variations, the air quality monitoring module 130 may incorporate sensors similar to those described in U.S. patent application Ser. No. 16/931,300, the content of which is hereby incorporated by reference in its entirety.

The sensor data (e.g., sensor data from the air quality monitoring module 130) can be transmitted from the environment management device 100 to one or more external devices and/or systems (e.g., a cloud platform, another environment management device, a third-party application, etc.) via the network communication modules 120.

The one or more network communication modules 120 can be configured to connect the environment management device 100 to another device and/or system (e.g., another environment management device 100, Internet, cloud platform, database, etc.) by wired or wireless connection. In some variations, the environment management device 100 may be in communication with other environment management devices (e.g., structurally and/or functionally similar to environment management device 100) via one or more wired or wireless networks. In some variations, the environment management device 100 can be configured to communicate with a cloud platform via wired or wireless connection.

In some variations, the network communication modules 120 may include a radiofrequency receiver, transmitter, and/or optical (e.g., infrared) receiver and transmitter configured to communicate with one or more device and/or networks. In an exemplary variation, the network communication modules 120 may include a cellular modem (e.g., 3G/4G/5G cellular modem) such that it is advantageously not dependent on internet Wireless Fidelity (WiFi) access for connectivity. For example, in some variations the network communication modules 120 may include a cellular modem for built-in cellular connectivity (e.g., a SIM card may be included) and thus the environment management device 100 may be easily installed without the need for a local network infrastructure (e.g., WiFi). Furthermore, in some variations the environment management device 100 may include WiFi as a secondary network communication option (e.g., in the event of failure of cellular communication, such as due to a cellular tower failure or other outage).

Alternatively, wireless communication may use any of a plurality of communication standards, protocols, and technologies, including but not limited to, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, WiFi, or any other suitable communication protocol.

The network communication modules 120 can be communicatively coupled to the air purification module 110. The air purification module 110 can purify (e.g., filter and/or disinfect) the air in the environment. In some variations, the air purification module 110 can include ionizers, which may filter the air by charging particles such that they form large particles that fall more quickly to the ground due to weight and thus cease being airborne. The ionizers may, for example, enable aggregation of particles such as pollen, dust, pet dander, other allergens, droplets, etc. The air purification module 110 can also include one or more disinfecting components (e.g., ultraviolet light source(s)) to sanitize or disinfect the air to reduce odors, kill airborne pathogens (e.g., viruses, bacteria, chemicals, etc.) that cause sickness, etc.

In some variations, the air purification module 110 can include at least one fan to pull the air into the environment management device 100 and to improve air circulation in the environment. The speed of the fan within the air purification module 110 can be associated with an intensity of air purification. For instance, higher fan speed can result in higher intensity of air purification. Likewise, lower fan speed can result in lower intensity of air purification. In some variations, the air purification module 110 can include an inlet that allows passage of air from the environment into the air purification module 110 that is to be purified (e.g., filtered, disinfected, sanitized). The air purification module 110 can include an outlet that allows passage of purified air from the air purification module 110 back into the environment.

One or more controllers 150 can be communicably coupled to the air purification module 110, the air quality monitoring module 130, and the network communications modules 120. In some variations, the controllers 150 can receive sensor data from the air quality monitoring module 130 and can analyze the sensor data. In some variations, the controllers 150 can transmit raw sensor data and/or analyzed sensor data to one or more external systems and/or devices (e.g., a cloud platform, a third-party application, etc.) via the network communication modules 120. In some variations, the controllers 150 can receive instructions from one or more external systems and/or devices (e.g., a cloud platform, a third-party application etc.) to control the intensity of air purification.

In some variations, the controllers 150 can control the intensity of air purification by the air purification module 110. For instance, the controllers 150 can be configured to apply one or more various algorithms (e.g., artificial intelligence and/or machine learning algorithms) to control air purification. The algorithms can be implemented to control the speed of the fan within the air purification module 110.

In some variations, the controllers 150 can be configured to process instructions from one or more external systems and/or devices (e.g., a cloud platform, a third-party application, etc.) and control air purification based on these processed instructions.

In some variations, controllers 150 can include a processor (e.g., CPU). The processor may be any suitable processing device configured to run and/or execute a set of instructions or code, and may include one or more data processors, image processors, graphics processing units, physics processing units, digital signal processors, and/or central processing units. The processor may be, for example, a general purpose processor, a Field Programmable Gate Array (FPGA), an Application Specific Integrated Circuit (ASIC), and/or the like. The processor may be configured to run and/or execute application processes and/or other modules, processes and/or functions associated with the system and/or a network associated therewith. The underlying device technologies may be provided in a variety of component types (e.g., MOSFET technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and/or the like.

The controllers 150 can be communicably coupled to one or more memory devices 140 (which can include one or more computer-readable storage mediums). The memory devices 140 can be configured to store sensor data from the air quality monitoring module 130, instructions from the controllers 150, analytics from the controllers 150 and/or from an external device and/or system (e.g., a cloud platform).

In some variations, the memory devices 140 may include a database and may be, for example, a random access memory (RAM), a memory buffer, a hard drive, an erasable programmable read-only memory (EPROM), an electrically erasable read-only memory (EEPROM), a read-only memory (ROM), Flash memory, and the like. The memory devices 140 may store instructions to cause a processor (e.g., controllers 150) to execute modules, processes, and/or functions such as measurement data processing, measurement device control, communication, and/or device settings.

The display 160 included in the environment management device 100 can communicate information such as device status, air quality information (e.g., an air quality target and/or an air quality score to a user), as further described below. The display 160 can be situated on an external surface of the environment management device 100 such that it is easily visible to the user. In some variations, the display 160 can be a light indicator that includes a waveguide that is coupled to one or more light sources (e.g., one or more LEDs). In some variations, the display 160 can include a light waveguide.

The display 160 can communicate to the user an air quality target and/or an air quality score. For instance, an air quality target can be representative of a quality of air to be achieved for an environment (e.g., indoor space such as inside of a car, bus, train, elevator, etc.). The air quality score can be representative of the current quality of air in the environment. In some variations, the air quality score may be similar to the air quality score and/or environment quality score and/or environmental quality score described in U.S. patent application Ser. No. 16/931,300, which was incorporated by reference above.

In some variations, the air quality target and/or the air quality score can be displayed as a text, number, character, emoticon, image, combinations thereof, and/or the like. For example, a numerical parameter can be shown on the display 160 that is representative of the air quality target and/or the air quality score. In some variations, the display 160 can present a text such as "HIGH," "LOW," "MODERATE," and/or the like that is representative of the air quality target and/or the air quality score. In some variations, the display 160 can present emoticons such as a sad face, neutral face, happy face, or other representative icons that indicates the air quality target and/or the air quality score. In some variations, the display 160 can be coupled to light sources of different colors that are indicative of the air quality target and/or the air quality score (i.e., color-coded). For instance, red light may indicate a high air quality score while green light may indicate a lower air quality score.

In some variations, the display 160 can indicate a device status, such as whether the environment management device is powered on, communicatively connected to a network, etc. For example, the display 160 can include a light waveguide. The light waveguide can display text (e.g., text such as "ONLINE" for powered on and "OFFLINE" for powered off) to indicate whether the environment management device 100 is powered on. In some variations, the light waveguide can output varying illumination patterns, such as blinking or flashing of the waveguide to indicate whether the environment management device 100 is powered on.

Figure 2:
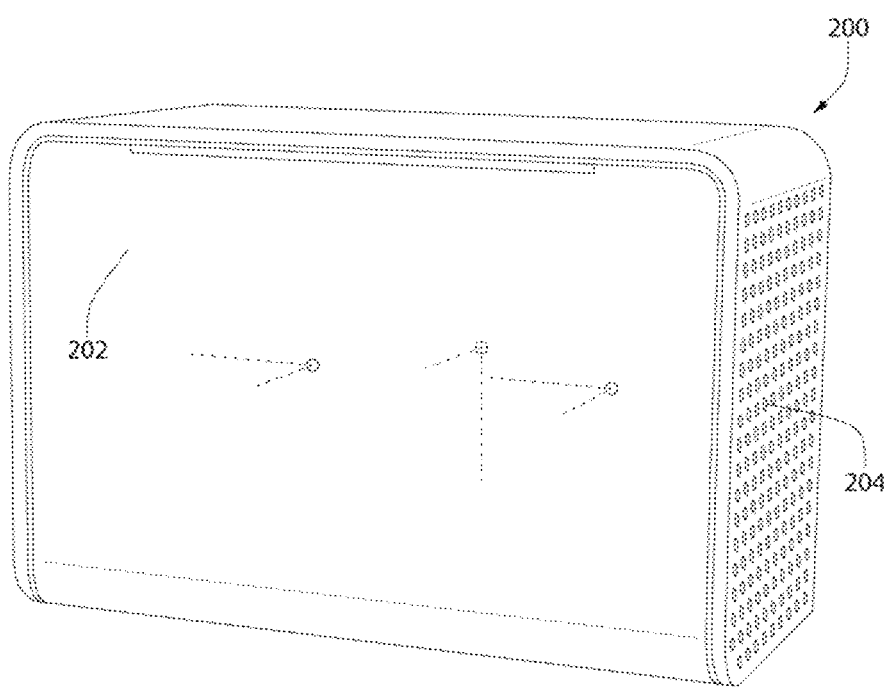
FIG. 2 is an exemplary variation of an intelligent environment monitoring and purification device.

FIG. 2 is an exemplary variation of the environment management device 200 (e.g., structurally and/or functionally similar to environment management device 100). The environment management device 200 can include a housing 202 for enclosing an air purification module (e.g., air purification module 110 in FIG. 1), an air quality monitoring module (e.g., air quality monitoring module 130 in FIG. 1), other electronic components, etc. The housing 202 can include vents 204 for allowing air to enter and exit the environment management device 200.

In some variations, the housing 202 can include several components that are coupled together. These components can be manufactured in any suitable manner (e.g., injection molding, machine techniques, etc.). The components can be coupled together with interlocking mating features, fasteners (e.g., mechanical fasteners, epoxy), and/or or other suitable coupling elements.

In some variations, the housing 202 can include a mount (not shown in FIG. 2) such as surface mount for coupling the environment management device 200 to a surface. In some variations, the mount may include fastener holes for receiving fastener, which may couple the mount to a surface (e.g., vertical surface such as a wall). In some variations, the mount may include one or more level devices (e.g., bubble level) to help a user position the mount in a horizontally level position.

The environment management device 200 can be mounted onto various surfaces such as the back of a driver and/or passenger seat of a vehicle, a car dash, a ceiling, a wall, to furniture, and/or the like via the housing 202. In some variations, the housing 202 can include one or more locking mechanisms to secure the connection between the environment management device 200 and the surface.

In some variations, the housing 202 can include a display (e.g., structurally and/or functionally similar to display 160 in FIG. 1). In some variations, the housing 202 can include a power on/off button configured to alter the operating state and/or mode of the environment management device 200. In some variations, the housing 202 can function as a weather shield sheltering the air quality monitoring module and the air purification module from the sun, rain, wind, etc. In some variations, the housing 202 can include an ultraviolet-treated surface and/or a reflective coating to reduce absorption of heat. In some variations, the housing 202 can include a removable cover so as to permit access to the contents of the environment management device 200 (e.g., the air quality monitor module, the air purification module, sensors, other electronic components, power source, and/or the like).

Air can enter and/or exit the environment management device 200 through the housing 202 via the vents 204. In some variations, vents 204 are located on two ends (e.g., opposite ends) of the environment management device 200. For example, air may flow in and/or out of the housing 202 through at least some of the vents 204 located on a first end (vents 204 shown in FIG. 2), and additionally or alternatively air may flow in and/or out of the housing 202 through at least some of the vents (not shown in FIG. 2) located on a second end (opposite to the first end where vents 204 are located). Although the vents 204 are shown as being circular, these vents 204 can be of any suitable shape (e.g., elongated, slot-like, etc.).

In some variations, the components of the environment management device (e.g., air purification module, air quality monitoring module, etc.) may be integrated in a single device (e.g., housed in a single environment management device 200). Additionally or alternatively, in some variations, one or more components described herein for the environment management device may be omitted or disabled, and its functionality may be replaced by or supplemented by another external system (e.g., third party system). For example, in some variations, an environment management device including an air quality monitoring module (and with an air purification module omitted or disabled) may be mounted onto or embedded in a surface such as in a vehicle (e.g., back of a driver and/or passenger seat of a vehicle, in a car dash) and be operably coupled to an air processing unit built into the vehicle (HVAC, air filtering or purification, etc.). The vehicle may be, for example, a car, train, bus, watercraft, aircraft, or spacecraft. In such variations, the environment management device may, for example, interface with an operating system of the vehicle such as via one or more Application Programming Interfaces (APIs). Accordingly, the environment management device may monitor air quality within the vehicle, and communicate sensor data and/or control signals to the operating system of the vehicle in order to control the vehicle's air processing unit to purify the air within the vehicle in a suitable closed-loop manner (e.g., in accordance with the closed-loop feedback methods described herein). In other similar examples, an environment management device may be mounted onto or embedded in any suitable surface of an environment such as other transportation environments (e.g., elevator) or indoor environments (e.g., building) and interface with an operating system for an HVAC unit or other air processing unit for that environment.

Air Purification Module

Figure 3:
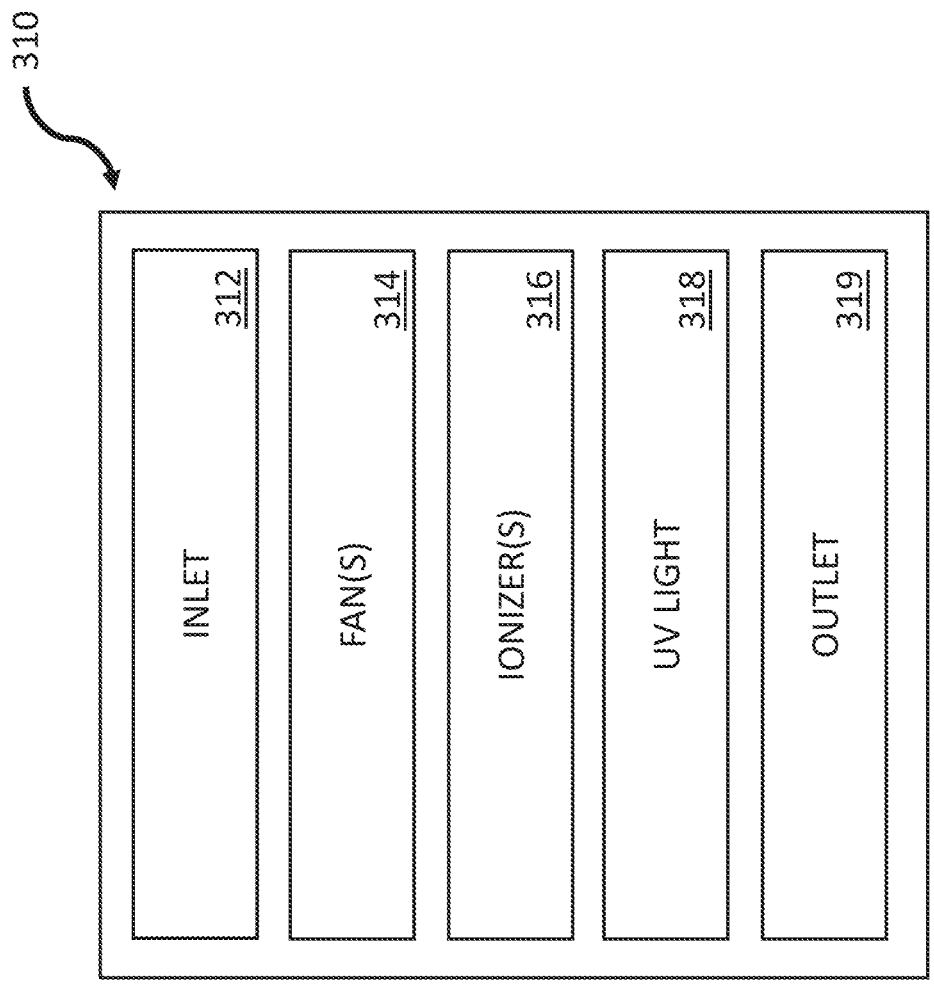
FIG. 3 is an illustrative schematic of an exemplary variation of an air purification module included in an intelligent environment monitoring and purification device.

FIG. 3 is an illustrative schematic of an exemplary variation of an air purification module 310 (e.g., structurally and/or functionally similar to air purification module 110 in FIG. 1) included in an environment management device (e.g., environment management device 100 in FIG. 1 and/or environment management device 200 in FIG. 2). The air purification module 310 can include an inlet 312 to allow passage of air from an environment into the environment management device. A fan 314 can pull the air into the environment management device and/or the air purification module 310 within the environment management device. One or more ionizers 316 can help reduce airborne particles. One or more disinfecting components such as ultraviolet lights (UV lights) 318 can disinfect the air by killing airborne pathogens. The purified air (e.g., filtered and disinfected air) can be sent into the environment through an outlet 319.

Air enters the air purification module 310 through an inlet 312. The inlet 312 can be vents that are located on a housing (e.g., housing 202 in FIG. 2) of the environment management device. The vents can be located on one or more sides of the housing of the environment management device. For example, the vents of the inlet 312 can be located on one side of the housing of the environment management device while vents of the outlet 319 can be located on another side (e.g., side opposite to the inlet 312) of the housing of the environment management device. The vents can be of any suitable shape (e.g., circular, elongated, slot-like, etc.). In some variations, one or more vents of the inlet 312 can allow unpurified air to enter into the environment management device, and additionally or alternatively, other vents of the inlet 312 can allow purified air to exit the environment management device. In some variations, the inlet 312 can vent heat from the electronic components present inside the environment management device in order to avoid overheating of the environment management device.

A fan such as fan 314 can pull air through the air purification module 310. In some variations, the fan 310 can be an electric fan consisting of a small electric motor with fan blades (e.g., metal fan blades) that are attached to the electric motor's power take-off. In some variations, the fan blades can be attached to a collar which can be slipped onto the power take-off. In some variations, the fan 314 can be attached to a housing (e.g., housing 202 in FIG. 2) of the environment management device using a suitable fastener (e.g., screws, bolts, adhesive, etc.).

In some variations, the fan 314 (e.g., metal fan blades of the fan and/or the electric motor of the fan) can be communicatively coupled to an external device and/or system (e.g., a cloud platform, other environment management devices, etc.). The external device and/or system can control the speed of the fan blades in order to control an intensity of air purification. In some variations, the fan 314 can be communicatively coupled to one or more controllers (e.g., controllers 150 in FIG. 1). The controllers can control the speed of the fan blades in order to control an intensity of air purification. In some variations, the noise produced by the fan 314 can be regulated by regulating the speed of the fan blades.

The size of the fan 314 can be chosen based on the size of the environment (e.g., the size of the room, the size of the vehicle, the size of the elevator, etc.) in which the environment management device will be placed. For example, for a sedan the size of the fan 314 can be chosen so as to perform at least 10 complete air circulations over an hour in a volume of about 100 cubic feet. In some variations, the fan 314 can cool down an indoor space by continuously blowing and/or circulating air.

Air that is circulated through the air purification module 310 can be purified using one or more ionizers 316. Ionizers 316 can charge airborne particles such that the airborne particles are attracted to each other, to some parts of the ionizer itself, and/or another surface within the environment management device. The charged airborne particle can become large enough so as to eventually collapse to the ground and stop being airborne.

In some variations, the ionizers 316 can include plates that are positively and negatively charged. Airborne particles are attracted to each of the negatively and positively charged plates as they pass through the air purification module 310.

In some variations, the ionizers 316 include a negative ion generator. The negative ion generator can charge the airborne particles. The charged particles are attracted to a nearby earthed conductor (e.g., plates within the ionizers 316, housing of the environment management device, walls, ceiling, and/or the like). In this manner, airborne particles such as dust, pollen, pet dander, etc. can be filtered out from the air.

In some variations, ionizers 316 can include plastic casings that enclose plates (e.g., steel plates). The steel plates can be arranged in any manner (e.g., parallel to each other). The plates can be arranged in such a manner that high voltage direct current can be applied to at least some plates. Some plates of the ionizer 316 can be grounded. The ionizers 316 can include a voltage transformer to convert alternating current into direct current. In some variations, ionizers 316 can include a nuclear source such as polonium 210 to negatively charge airborne particles so that they can be filtered out from the air.

UV lights 318 can disinfect the air from any pathogen or microorganisms and kill any type of odor. UV lights 318 can generate short-wavelength ultraviolet (UV-C) light to kill or inactivate pathogens. UV-C light can destroy and/or alter the Deoxyribonucleic acid (DNA) of microorganisms thereby killing and/or inactivating the microorganisms.

In some variations, UV lights 318 include a lamp and/or a bulb that emit light with the UV-C frequency. In some variations, UV lights 318 can include an emitter (e.g., phosphor or quartz) the emit blueish light that is invisible to human eye. In some variations, UV lights 318 can include mercury lamps that emit UV-C light (e.g., UV-C light at a wavelength between 200-280 nm, such as for example a wavelength of 254 nm).

In some variations, UV lights 318 can be placed on either side of the ionizers 316. In some variations, the UV lights 318 can be placed in such a manner that they are in a position that is downstream to the ionizers 316. The number of UV lights 318 in the air purification module 310 can depend on various factors such as size of the environment (e.g., size of the space), maximum occupant capacity in the environment, wavelength and intensity of the light emitted by the UV lights 318, materials of the emitter, and/or the like.

Additionally or alternatively, the air purification module 310 may include any suitable purification components, such as one or more filters (e.g., passive filters, such as activated charcoal, HEPA, etc.).

Purified air can exit the air purification module 310 and/or the environment management device through an outlet 319. The outlet can be vents that are located on a housing (e.g., housing 202 in FIG. 2) of the environment management device. The vents can be located on one or more sides of the housing of the environment management device. In one variation, the vents can be located such that the vents of the outlet 319 are in an opposite side of the housing to the vents of the inlet 312. Put differently, the outlet 319 and the inlet 312 can be on opposite ends of a flow path in the environment management device. The vents can be of any suitable shape (e.g., circular, elongated, slot-like, etc.). In some variations, one or more vents of the outlet 319 can allow clean purified air to exit the environment management device, and additionally or alternatively, other vents of the outlet 319 can allow unpurified air to enter into the environment management device. In some variations, the outlet 319 can vent heat from the electronic components present inside the environment management device in order to avoid overheating of the environment management device.

Figure 4:
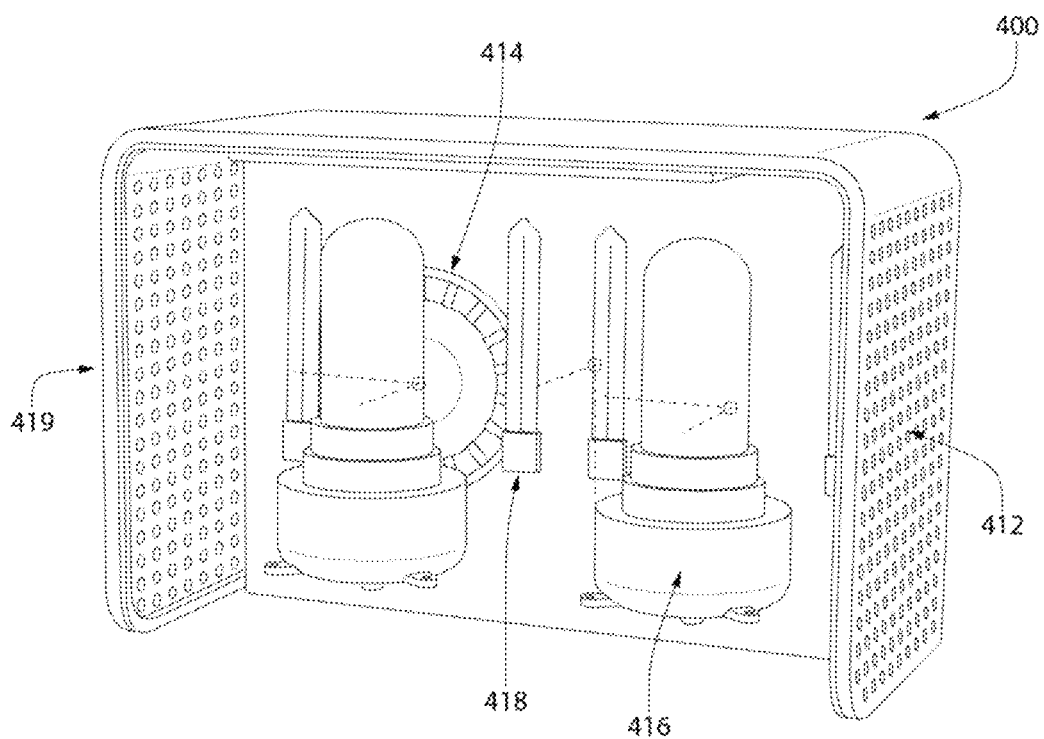
FIG. 4 is an exemplary variation of the intelligent environment monitoring and purification device shown in FIG. 2 illustrating the components of an air purification module.

FIG. 4 is an exemplary variation of an environment management device 400 (e.g., environment management device 100 in FIG. 1 and/or environment management device 200 in FIG. 2) illustrating the components of an air purification module (e.g. air purification module 310 in FIG. 3). As discussed in FIG. 3, an air purification module can include an inlet 412 (e.g., structurally and/or functionally similar to inlet 312 in FIG. 3) and an outlet 419 (e.g., structurally and/or functionally similar to outlet 419 in FIG. 3) to allow air to flow in and out of the environment management device 400. A fan 414 (e.g., structurally and/or functionally similar to fan 314 in FIG. 3) can pull the air into the environment management device 400 and can circulate the air within the environment management device 400. The ionizers 416 (e.g., structurally and/or functionally similar to ionizers 316 in FIG. 3) can help reduce large airborne particles from the air. The UV lights 418 (e.g., structurally and/or functionally similar to UV lights 318 in FIG. 3) can kill pathogens and odor in the air. Although the environment management device 400 is shown as including ionizers 416 and UV lights 418, in some variations, as described above, the environment management device may additionally or alternatively include one or more filters that purify the air, such as activated charcoal filter(s), HEPA filter(s), etc.

Air Quality Monitoring Module

Figure 5:
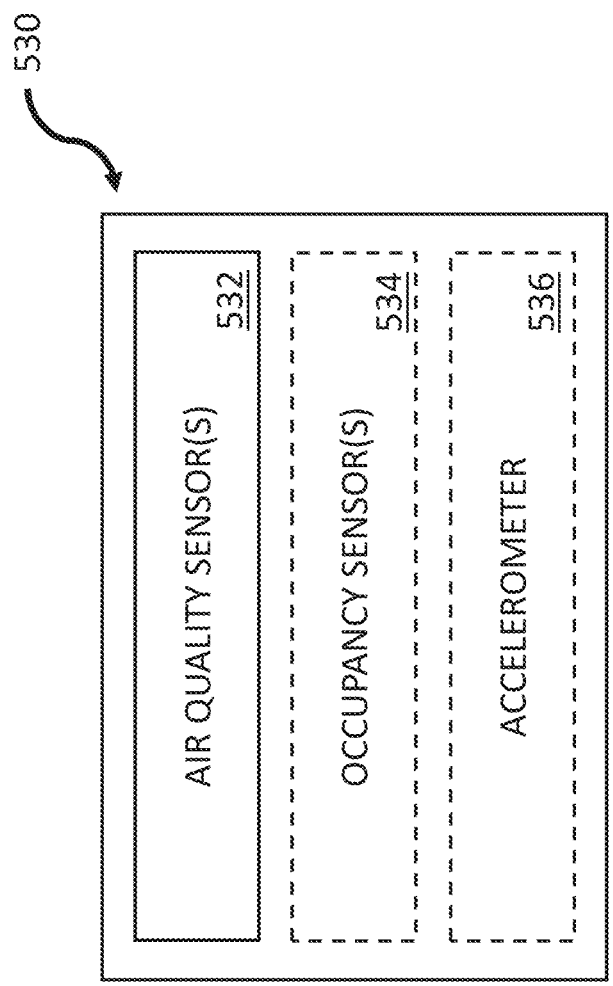
FIG. 5 is an illustrative schematic of an exemplary variation of an air quality monitoring module in an intelligent environment monitoring and purification device.

FIG. 5 is an illustrative schematic of an exemplary variation of an air quality monitoring module 530 (e.g., structurally and/or functionally similar to air quality monitoring module 130 in FIG. 1) included in an environment management device (e.g., environment management device 100 in FIG. 1 and/or environment management device 200 in FIG. 2).

The air quality monitoring module 530 can include one or more air quality sensors 532 that can measure various air quality parameters. These air quality parameters can be measured continuously so as to provide real-time assessment of the air quality within an environment. Air quality sensors 532 can receive sensor data at any suitable sampling frequency. In some variations, at least some of the air quality sensors 532 can receive sensor data multiple times per minute.

In some variations, the sensor data received at the air quality sensors 532 can be transmitted to one or more controllers (e.g., controllers 150 in FIG. 1), one or more memory devices (e.g., memory devices 140 in FIG. 1), and/or one or more external systems and/or devices (e.g., a cloud platform, an external database, another environment management device, and/or the like) in a periodic manner (e.g., at regular intervals). In some variations, the sensor data received at the air quality sensors 532 can be transmitted in response to queries and/or instructions from a controller (e.g., controllers 150 in FIG. 1) and/or external devices and/or systems (e.g., a cloud platform, another environment management device, a third-party application, etc.). For instance, a cloud platform can instruct the environment management device to sample sensor readings. In response to the instruction, the sensor data can be transmitted from the air quality monitoring module 530 to the cloud platform.

In some variations, every parameter can be reported at regular intervals (e.g., once every minute) to the controller and/or external devices and systems. In some variations, some parameters can be reported at regular intervals while other parameters are reported in response to a query and/or instruction. In some variations, some or all air quality parameters can be stored locally in an environment management device (e.g., in memory devices 140) such that in the event of a network outage or other communication failure, the sensor data is not lost.

In some variations, the air quality sensors 532 can include one or more sensors configured to measure amount of particulate matter (PM), such as dust, fungi, bacteria, viruses, and pollen, and combustion particles. Generally, the smaller these particulates are, the worse they are for health. Furthermore, smaller particulates are harmful because they linger in the atmosphere for longer (e.g., weeks), are freely transported by environment currents. For example, bacteria can cause infection after being released by coughs and/or sneezes. Accordingly, in some variations the air quality sensors 532 can include sensors that distinguish between different sizes of particulate matter. For example, the air quality sensors 532 includes sensors for measuring respective amounts (e.g., concentration, such as $\mu g/m^3$) of various sizes. For example, sensors may measure levels of PM10 (particulate matter that is about 10 μm or less in diameter, such as dust, pollen, or mold), PM2.5 (particulate matter that is about 2.5 μm or less in diameter, such as combustion particles) and/or PM1 (particulate matter that is about 1 μm or less in diameter, such as viruses).

In an exemplary variation, the air quality sensors 532 measures all three categories of PM10, PM2.5, and PM1, thereby providing a highly-precise measurement of particulate matter in the ambient environment. Specifically, the air quality sensors 532 may include a first sensor configured to detect PM10 particulates between about 2.5 μm and about 10 μm in diameter, a second sensor configured to detect PM2.5 particulates between about 1 μm and about 2.5 μm in diameter, and PM1 particulates below about 1 μm in diameter (e.g., between about 0.3 μm and 1μm in diameter). Each particulate matter sensor can have an effective measurement range of, for example, about 0 $\mu g/m^3$ to about 500 $\mu g/m^3$ and a resolution of about 1 $\mu g/m^3$. In some variations, the air quality sensors 532 may include sensor technology utilizing laser scattering to measure particulate matter.

Additionally or alternatively, the air quality sensors 532 may include one or more sensors configured to measure an amount of at least one gas in ambient environment. Elevated levels of certain gases can cause negative health effects. For example, elevated levels of carbon dioxide ($CO_2$) increases the likelihood of sleepiness, distraction, and lethargy, which in turn affects productivity, concentration, and work performance. In some variations, the air quality sensors 532 may include one or more sensors using non-dispersive infrared (NDIR) technology to detect $CO_2$. Volatile organic compounds (VOCs) are chemicals released by cleaning agents, burning fuels, and other substances, and can irritate respiratory passages, cause nausea, and increase the likelihood of cancer. In some variations, the air quality sensors 532 may include one or more sensors using metal-oxide-silicon (MOS) technology to measure VOCs. As another example, formaldehyde ($CH_2O$), which is used in building materials and many household products, can cause tissue irritation and may increase the likelihood of cancer. In some variations, the air quality sensors 532 may include one or more sensors using electrochemical methodology to measure $CH_2O$. As yet another example, carbon monoxide (CO) is an odorless, colorless gas that, when breathed by humans and other hemoglobic animals, displaces oxygen in the blood and leads to oxygen deprivation in vital organs and possibly death. In some variations, the air quality sensors 532 may include one or more sensors using electrochemical technology to measure CO. Accordingly, in some variations the air quality sensors 532 can measure amount of one or more of such gases. In an exemplary variation, the air quality sensors 532 includes sensors configured to measure amount of all three of $CO_2$, total VOCs, and $CH_2O$. For example, the air quality sensors 532 can include a $CO_2$ sensor having an effective measurement range of between about 0 ppm and about 3000 ppm and a resolution of about 1 ppm, a total VOC sensor having an effective measurement range of between about 1 ppm and about 30 ppm of ethanol, and a sensitivity of between about 0.15 Rs and about 0.5 Rs (sensor resistance) at (10 ppm of ethanol)/Rs (environment). Additionally or alternatively, in some variations the air quality sensors 532 may include one or more sensors configured to measure one or more nitric oxides (NOx), one or more sulfur oxides (SOx), hydrogen sulfide ($H_2S$), and/or other suitable gases.

Furthermore, the air quality sensors 532 may additionally or alternatively include at least one sensor configured to measure temperature, humidity, and/or other environmental conditions. Aside from discomfort, elevated temperature can, for example result in mental fatigue, which may cause diminished reaction times and delayed information processing. High levels of humidity can result in mold growth on surfaces, which may trigger various health conditions such as asthma, respiratory distress, and/or irritation of the eyes, nose, and mouth. Furthermore, exposure to hazardous conditions resulting from building decay, water damage, poor plumbing, and older pollutants can be exacerbated by high levels of humidity. Accordingly, in some variations the air quality sensors 532 can measure temperature and/or humidity of ambient environment. The air quality sensors 532 may, for example, include one or more sensors using MOS technology for measuring temperature and/or humidity. In an exemplary variation, the air quality sensors 532 includes at least one temperature sensor having a range of between about 0° C. and about 99° C. (or between about 15° C. and about 85° C.) and a resolution of about 0.1° C., and a humidity sensor having a range of between about 0% and 99% (or between about 10% and about 90%) relative humidity (RH) and a resolution of about 0.1% RH.

In some variations, the air quality sensors 532 may additionally or alternatively include at least one sensor configured to measure barometric pressure. Differences in barometric pressure (e.g., between different regions of a room, between an interior and an exterior of a room, etc.) can affect the flow of infectious particles. For example, a positively pressured room can protect occupants and/or materials in the room by tending to exclude infectious particles, while a negatively pressured room tends to contain infectious particles within a room. The magnitude of the pressure difference is correlated to the strength of the tendency to exclude or contain particles. Accordingly, in some variations the air quality sensors 532 can measure barometric pressure, such that multiple environment management devices can provide an indication of regional pressure differences. The air quality sensors 532 may, for example, include one or more sensors using MOS technology for measuring barometric pressure. In an exemplary variation, the air quality sensors 532 can include a barometer (pressure sensor) having a range of between about 300 hPa and about 1100 hPa, and a resolution of about 0.12 Pa.

In some variations, the air quality sensors 532 may additionally or alternatively include at least one sensor configured to measure sound intensity. Exposure to noisy environments may result in partial or complete hearing loss. Accordingly, in some variations the air quality sensors 532 may include one or more microphones configured to measure noise in the environment, or Sound Pressure Level (SPL). An exemplary microphone is a MEMS microphone including a piezoelectric sensor and circuitry to buffer and amplify sensor output. Furthermore, in order to distinguish ambient noises from noises generated by the environment management device (e.g., built-in cooling fan, thermal noise, etc.), signal processing on the signals from the one or more microphones may be performed. For example, signals from the one or more microphones may be filtered (e.g., high pass filter, low pass filter, bandpass filter, etc.). Additionally or alternatively, in some variations at least some noises generated by the environmental management device (e.g., fan, pump, etc.) may be reduced by temporarily turning off the noise-generating component(s) (e.g., pausing operation of the fan or pump) when sound intensity is being measured. In some variations, the noise-generating component(s) may be turned off a predetermined period of time before the sound intensity is being measured, so as to allow a settling period for activity and associated noise to cease (e.g., at least 1 second, at least 2 seconds, at least 3 seconds, at least 5 seconds, etc.). Furthermore, beamforming methods can be used to detect direction of sound.

In some variations, the air quality sensors 532 may additionally or alternatively include at least one sensor configured to measure ambient light intensity. Light intensity in a room may physiologically affect a person, leading to discomfort (e.g., fatigue, headaches) or other challenges (e.g., difficulty in focusing). Accordingly, in some variations the air quality sensors 532 may include one or more sensors configured to measure light intensity, such as a photocell (photoresistor), photodiode, or other suitable light sensor. Such one or more light sensors may be configured to determine the presence and/or intensity of light in ambient environment.

In some variations, the air quality sensors 532 can include one or more sensors to measure the amount of ozone in an environment.

In some variations, the air quality monitoring module 530 can optionally include one or more occupancy sensors 534 to detect the occupancy in an environment. The occupancy sensors 534 can be any suitable occupancy sensor (e.g., infrared sensors, ultrasonic sensors, etc.). Sensor data from the occupancy sensors 534 can be transmitted along with the air quality parameters to controllers (e.g., controllers 150 in FIG. 1), memory devices (e.g., memory devices 140 in FIG. 1), and/or external systems and/or devices (e.g., a cloud platform, an external database, another environment management device, and/or the like). In some variations, sensor data from the occupancy sensors 534 can be transmitted in response to queries and/or instructions from a controller (e.g., controllers 150 in FIG. 1) and/or external devices and/or systems (e.g., a cloud platform, another environment management device, a third-party application, etc.).

In some variations, the air quality monitoring module 530 can optionally include one or more accelerometer sensors 536 to measure acceleration and/or movement of the environment in which the environment management device is placed. For instance, the accelerometer sensors 536 can detect that an elevator is in motion should an environment management device be placed in the elevator. Sensor data from the accelerometer sensors 536 can be transmitted along with the air quality parameters to controllers (e.g., controllers 150 in FIG. 1), memory devices (e.g., memory devices 140 in FIG. 1), and/or external systems and/or devices (e.g., a cloud platform, an external database, another environment management device, and/or the like). In some variations, sensor data from the accelerometer sensors 536 can be transmitted in response to queries and/or instructions from a controller (e.g., controllers 150 in FIG. 1) and/or external devices and/or systems (e.g., a cloud platform, another environment management device, a third-party application, etc.).

In some variations, the air quality monitoring module 530 can include at least one location sensor such as a global positioning system (GPS) receiver (not shown in FIG. 5) for providing GPS data representative of the location of the environment management device. The GPS receiver can be configured to receive positioning signals from GPS satellites through a GPS antenna, such that location of the GPS receiver can be determined based on trilateration. Location of the GPS receiver, which can be correlated to location of the environment management device associated with the GPS receiver. This location can be communicated to the controller (e.g., controllers 150 in FIG. 1) and/or external devices and/or systems (e.g., a cloud platform, another environment management device, a third-party application, etc.).

Figure 6:
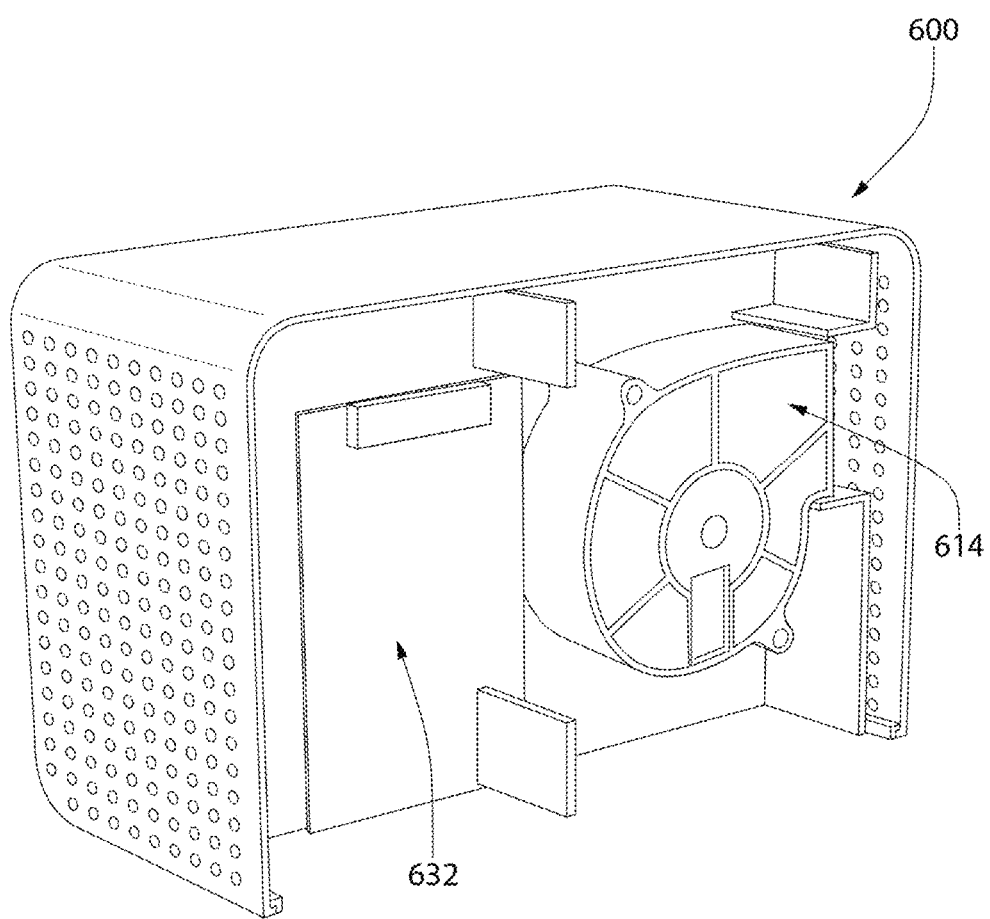
FIG. 6 is an exemplary variation of the intelligent environment monitoring and purification device shown in FIG. 2 illustrating components of an air quality monitoring module.

FIG. 6 is an exemplary variation of the environment management device 600 (e.g., environment management device 100 in FIG. 1 and/or environment management device 200 in FIG. 2) illustrating the components of an air quality monitoring module (e.g. air quality monitoring module 530 in FIG. 5). The air quality sensors (e.g., air quality sensors 532 in FIG. 5) can be placed inside an enclosure such as enclosure 632. In some variations, the enclosure 632 can optionally include occupancy sensor (e.g., occupancy sensors 534 in FIG. 5), accelerometer sensor (e.g., accelerometer sensors 536 in FIG. 5), and/or GPS receiver. A fan exhaust 614 such as exhaust associated with fan 414 in FIG. 4 can eliminate odor and/or remove moisture from the air.

System for Intelligent Environment Monitoring and Purification

Figure 7:
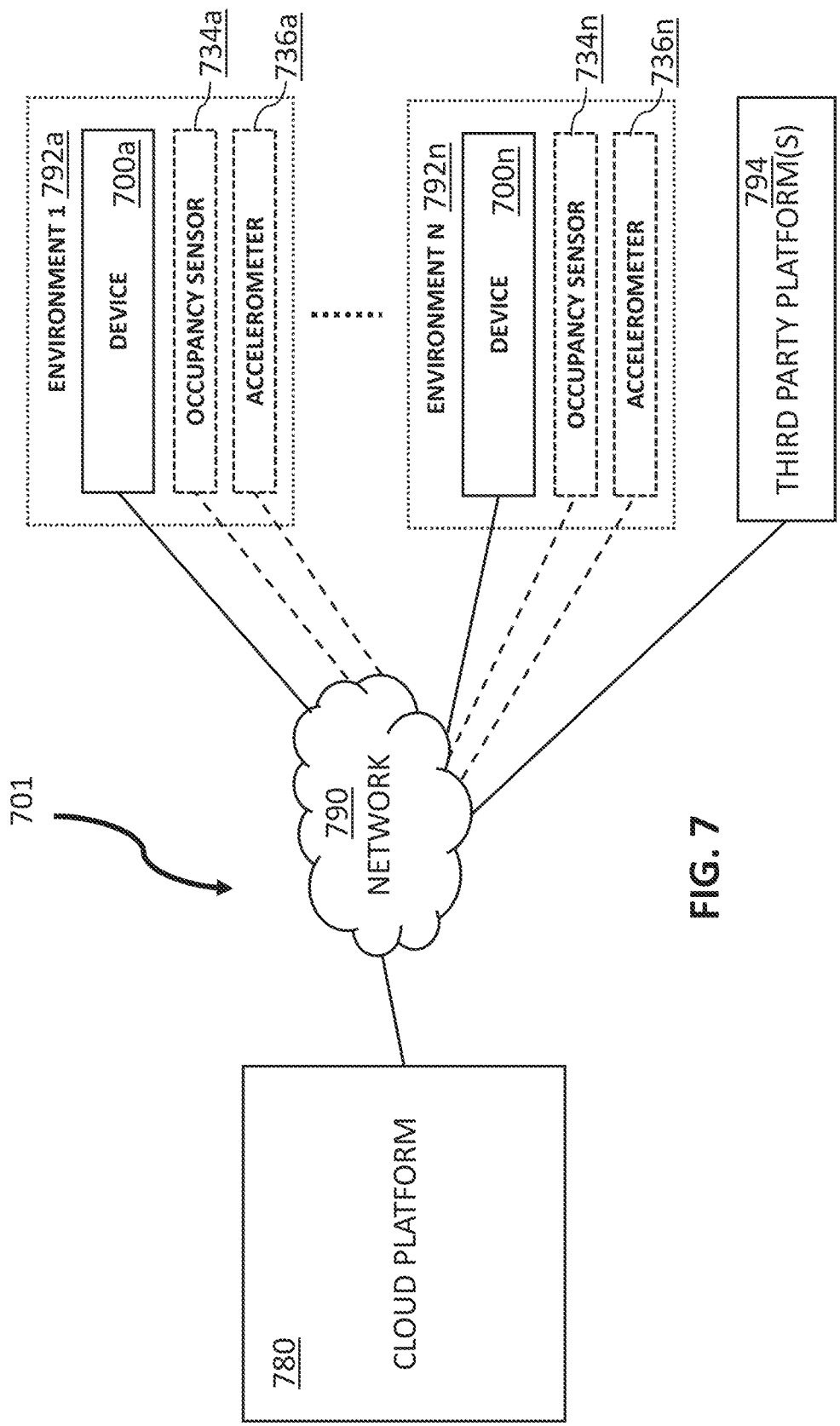
FIG. 7 is an illustrative schematic of an exemplary variation of a system for intelligent environment monitoring and purification.

FIG. 7 is an illustrative schematic of an exemplary variation of a system 701 for intelligent environment monitoring and purification. System 701 can collect data from multiple different environments, process the data, develop analytics (e.g., by using machine learning algorithms, neural networks, deep learning, and/or the like), and control air purification in each environment based on the analytics. Furthermore, these analytics can be used by third-party applications (e.g., ride-share applications such as Uber™, Lyft™, etc., Amtrak™, and/or the like) to provide added or improved functionalities.

As seen in FIG. 7, each environment such as environment 792a-792n, collectively environment 792 can include an environment management device 700a-700n, collectively environment management device 700 respectively. Put differently, environment management device 700a can be placed in environment 792a and environment management device 700n can be placed in environment 792n. environment management device 700 can be structurally and/or functionally similar to environment management device 100 in FIG. 1, environment management device 200 in FIG. 2, environment management device 400 in FIG. 4, and/or environment management device 600 in FIG. 6.

FIG. 7 shows two environments 792a and 792n and two environment management devices 700a and 700n solely for illustrative purposes. It should be readily understood that system 701 can include any number of environments 792 with one or more environment management devices 700 in each environment 792. For instance, an environment 792b (not shown in FIG. 7) can include environment management device 700b (not shown in FIG. 7) and environment management device 700c (not shown in FIG. 7).

Every environment 792 can optionally include an occupancy sensor (e.g., occupancy sensor 734a and 734n, collectively occupancy sensor 734) and an accelerometer (e.g., accelerometer 736a and 736n, collectively 736). In some variations, the occupancy sensor 734 and/or the accelerometer 736 are included in an environment management device 700 (e.g., included in an air quality monitoring module of an environment management device). In some variations, the occupancy sensor 734 and/or the accelerometer 736 are disposed in a respective environment 792 such that they can communicate with the environment management device 700 in that environment 792. In some variations, the occupancy sensor 734 and/or the accelerometer 736 are disposed in a respective environment 792 such that they can communicate with a cloud platform 780 that in turn communicates with the environment management device 700 in that environment 792.

The cloud platform 780 can be connected to each environment management device 700 via a network 790. In some variations, network 790 is be a wireless network that adopts any suitable communication protocol (e.g., GSM, EDGE, CDMA, Bluetooth, Wi-Fi, etc.). Additionally, the cloud platform 780 can communicate with one or more third-party applications 794 via the network 790.

Each environment management device 700 can collect sensor data (e.g., sensor data from air quality sensors 532 in FIG. 5) from its respective environment 792. In some variations, the sensor data can be processed by a controller (e.g., controllers 150 in FIG. 1) included in the environment management device 700 and the processed data that is representative of the air quality within the environment 792 can be transmitted to the cloud platform 780. For example, the controller can process the sensor data to generate air quality parameters that are indicative of the quality of air within the environment 792. These air quality parameters can be transmitted to the cloud platform. In other variations, the sensor data itself can be transmitted to the cloud platform 780 and the cloud platform 780 can compute the air quality parameters.

In some variations, occupancy data for a respective environment 792 can be transmitted from the occupancy sensor 734 to the cloud platform 780. The cloud platform 780 can process the occupancy data to extract occupancy information. For example, the cloud platform 780 can process the occupancy data to determine the number of people in an environment 792. In some variations, a controller (e.g., controllers 150 in FIG. 1) included in the environment management device 700 can process the occupancy data from the occupancy sensor 734 to extract occupancy information. The occupancy information can then be transmitted from environment management device 700 to the cloud platform 780. In a similar manner, data from the accelerometer 736 can be processed either at a controller (e.g., controllers 150 in FIG. 1) included in the environment management device 700 and/or at the cloud platform 780.

The cloud platform 780 can receive data from each environment 792 via the network 790. The cloud platform 780 can process this data to generate analytics. Put differently, the cloud platform can implement one or more machine learning algorithms, deep learning modules, neural network modules, artificial intelligence and/or the like to gain insightful information from the data. These analytics can be used to transmit instructions to the environment management device 700 in order to control the air purification.

For example, the cloud platform 780 can process the data to determine air quality scores that are representative of the quality of air in an environment 792 for various types of occupancy. Furthermore, the cloud platform 780 can predict air quality targets that are representative of the quality of air to be achieved in an environment 792. Based on these analytics, the cloud platform can generate various profiles of air quality. These profiles can be deployed onto each individual environment management device 700 via the network 790. Furthermore, these profiles can form the basis of instructions that can be transmitted to the environment management device 700 in order to control and regulate the purification.

Example Analytics

Example 1—Consider a first environment 792 to be the indoor space within a first vehicle. Consider a second environment 792 to be the indoor space within a second vehicle (e.g., a second vehicle similar in size to the first vehicle). The cloud platform 780 can receive air quality parameters that characterize the quality of air in the first vehicle from a first environment management device 700 that is placed in the first vehicle. Based on the air quality parameters, the cloud platform 780 can calculate an air quality score that is representative of the quality of air in the first vehicle. Approximately around the same time, the cloud platform 780 can also receive the occupancy data for the first vehicle from an occupancy sensor 734 within the first vehicle. The cloud platform 780 can then map the air quality score to the number of people in the first vehicle. In a similar manner, the cloud platform can map air quality score from a second environment management device 700 in the second vehicle to the number of people in the second vehicle.

The cloud platform 780 can continue to collect such data and over time the data would include mappings of multiple air quality scores for a vehicle (e.g., a vehicle similar in size to the first vehicle and the second vehicle) to the corresponding number of people in a vehicle (e.g., a vehicle similar in size to the first vehicle and the second vehicle). Based on these mappings, the cloud platform 780 can make various predictions. For instance, the cloud platform 780 can determine an air quality target for a vehicle (e.g., a vehicle similar in size to the first vehicle and the second vehicle) when the occupancy is two people vs. the air quality target for a vehicle (e.g., a vehicle similar in size to the first vehicle and the second vehicle) when the occupancy is three people, etc.

In some variations, these air quality targets can form the basis for controlling air purification within a vehicle (e.g., a vehicle similar in size to the first vehicle and the second vehicle). For instance, if the cloud platform is informed of a potential change in occupancy (e.g., a change in occupancy from two people to three people) for a third vehicle (e.g., a third vehicle similar in size to the first vehicle and the second vehicle), the cloud platform 780 can send instructions to the environment management device 700 within the third vehicle to control the air purification (e.g., to control the air purification module within the environment management device) such that the quality of air within that third vehicle meets the air quality target (e.g., air quality target for a vehicle similar in size to the first vehicle and the second vehicle with an occupancy of three). The cloud platform 780 can determine if the environment management device 700 has achieved this air quality target based on the sensor data that it receives from the environment management device's 700 air quality monitoring module (e.g., air quality monitoring module 530 in FIG. 5).

Example 2—In some variations, the cloud platform 780 can receive the GPS location of a car. The cloud platform 780 can retrieve ambient air quality (i.e., air quality of the outdoor environment) for that location. For instance, if the GPS location of the car shows Palo Alto, the cloud platform 780 can retrieve ambient air quality information for Palo Alto. The ambient air quality can be retrieved in any suitable manner (e.g., extracting information from a website that includes ambient air quality information for various locations, retrieving ambient air quality information from an external database, retrieving ambient air quality information from an internal database, and/or the like). The cloud platform 780 can determine an air quality target based on the ambient air quality. For example, if the ambient air quality is poor then the air quality target for inside of a car can be high. The cloud platform can send instructions to the environment management device 700 within the car to control the air purification. In this example the cloud platform 780 can send instructions to the environment management device 700 to increase an intensity of air purification.

Example 3—Consider an environment 792 to be the inside of an elevator. Elevators are often small spaces that are prone to higher noise levels. The cloud platform 780 can send instructions to an environment management device 700 located in the elevator such that the intensity of air purification is regulated so as to regulate the noise levels. For example, the cloud platform 780 can receive indication from an accelerometer 736 that the elevator is in motion. The cloud platform 780 can send instructions to the environment management device 700 to reduce the intensity of air or purification when the elevator is in motion. In some variations, an occupancy sensor 734 detects that the elevator is empty. Based on this detection, the cloud platform 780 can send instructions to the Environment management device 700 to increase the intensity of air purification.

The example analytics discussed above are solely for illustrative purposes. It should be readily understood that various insights can be gathered using system 701. Based on these insights, environment management devices 700 can be controlled in a suitable manner so as to control the air purification. In some variations, a combination of analytics can form a basis to control the air purification module within environment management devices 700. For example, an environment management device 700 can be controlled based on a combination of analytics from example 1, example 2, and example 3. In another scenario, an environment management device can be controlled solely based on analytics from example 1 and example 2, or example 2 and example 3, or example 3 and example 1.

The instructions to control air purification are transmitted from the cloud platform 780 to each environment management device 700 via the network 790. These instructions can include instructions to vary the speed of a fan (e.g., fan 314 in FIG. 3), reduce noise of an air purification module (e.g., air purification module 110 in FIG. 1), increase an intensity of air purification, and/or the like. The air quality monitoring module (e.g., air quality monitoring module 130 in FIG. 1) can monitor the quality of air to make sure that the environment management device 700 follows the instructions.

Third-party applications 794 can use the analytics and/or insights gained from the cloud platform 780 in order to expand and/or improve upon their functionality. For example, a ride-share application (e.g., third-party application 794) can connect to the cloud platform 780 via an Application Programming Interface (API). The ride-share application can gain insights to the quality of air within each of its car that includes an environment management device

700. Based on these insights, the ride-share application can expand its functionality to include a new category of service that provides customers with an opportunity to pick a ride (using the third-party application) based on the quality of air. Rides with high air quality may be priced higher.

In some variations, the ride-share application can transmit information of potential rides to the cloud platform 780. For example, a ride-share application can relay to the cloud platform 780 information that a specific car is on its way to pick up a ride with two passengers. The cloud platform 780 can use this information to transmit instructions to an environment management device 700 in that car to control its air purification. For instance, the cloud platform 780 can send instructions to meet an air quality target for that specific car model with a default number of occupants (e.g., three occupants including one driver and a default number of two passengers) or an indicated number of occupants based on a number of passengers communicated through the ride-share application by an anticipated passenger (e.g., four occupants including one driver and an indicated number of three passengers for the ride).

In this manner, third-party application can use insights generated from data collected from various environment management devices 700 to expand and add-on to their functionalities.

Figure 8:
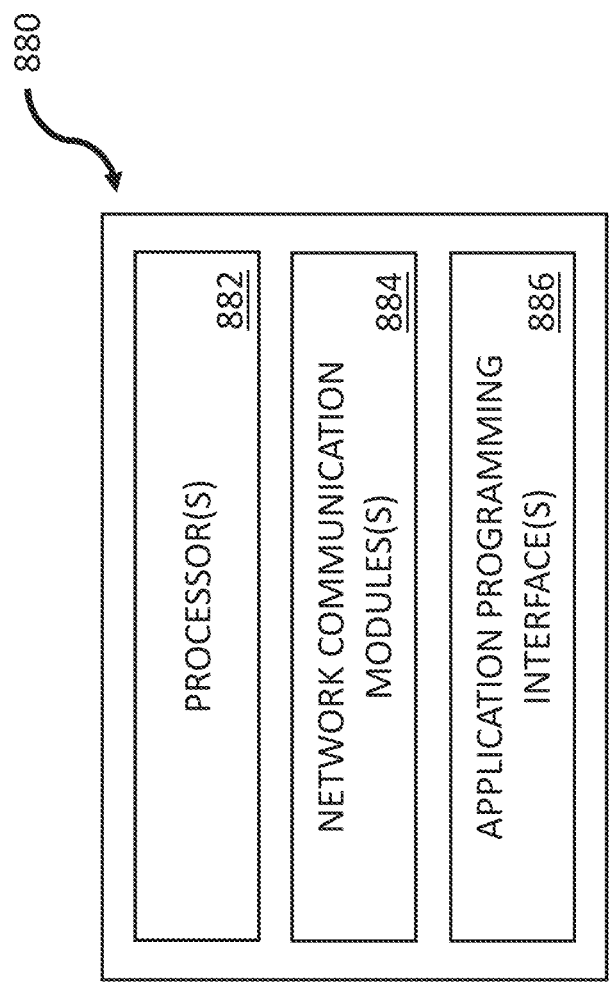
FIG. 8 is an illustrative schematic of an exemplary variation of a cloud platform.

FIG. 8 is an illustrative schematic of an exemplary variation of a cloud platform 880 (e.g., structurally and/or functionally similar to cloud platform 780 in FIG. 7). The cloud platform can include one or more processors 882, one or more network communication modules 884, and one or more application programming interfaces 886.

In some variations, the processors 882 can receive sensor data from one or more environment management devices. In some variations, the processors 882 can transmit instructions to one or more environment management devices. In some variations, the processors 882 can perform analytics on the received data and generate instructions to regulate and/or control some or all of the environment management devices. For instance, the processors 882 can be configured to apply one or more various algorithms (e.g., artificial intelligence and/or machine learning algorithms) to control air purification in environment management devices. The algorithms can be implemented to control the speed of the fan within an air purification module included in the environment management device. In some variations, the processors 882 can be configured to receive information from third-party applications and can generate instructions to control air purification based on this information.

In some variations, processors 882 can include a processor (e.g., CPU). The processor may be any suitable processing device configured to run and/or execute a set of instructions or code, and may include one or more data processors, image processors, graphics processing units, physics processing units, digital signal processors, and/or central processing units. The processor may be, for example, a general purpose processor, a Field Programmable Gate Array (FPGA), an Application Specific Integrated Circuit (ASIC), and/or the like. The processor may be configured to run and/or execute application processes and/or other modules, processes and/or functions associated with the system and/or a network associated therewith. The underlying device technologies may be provided in a variety of component types (e.g., MOSFET technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and/or the like.

The one or more network communication modules 884 can be configured to connect the cloud platform 880 with one or more environment management device and/or with third-party applications by wired or wireless connection. The specification of the network communication modules 884 is similar to and/or the same as the network communication modules 120 in FIG. 1. The one or more APIs 886 allow third-party applications (e.g., ride-share applications such as Uber™, Lyft™, etc.) to interface with the cloud platform 880. The APIs 886 can be designed in a standard manner (e.g., via Javascript™, PHP™ Python™, etc.).

Figure 9:
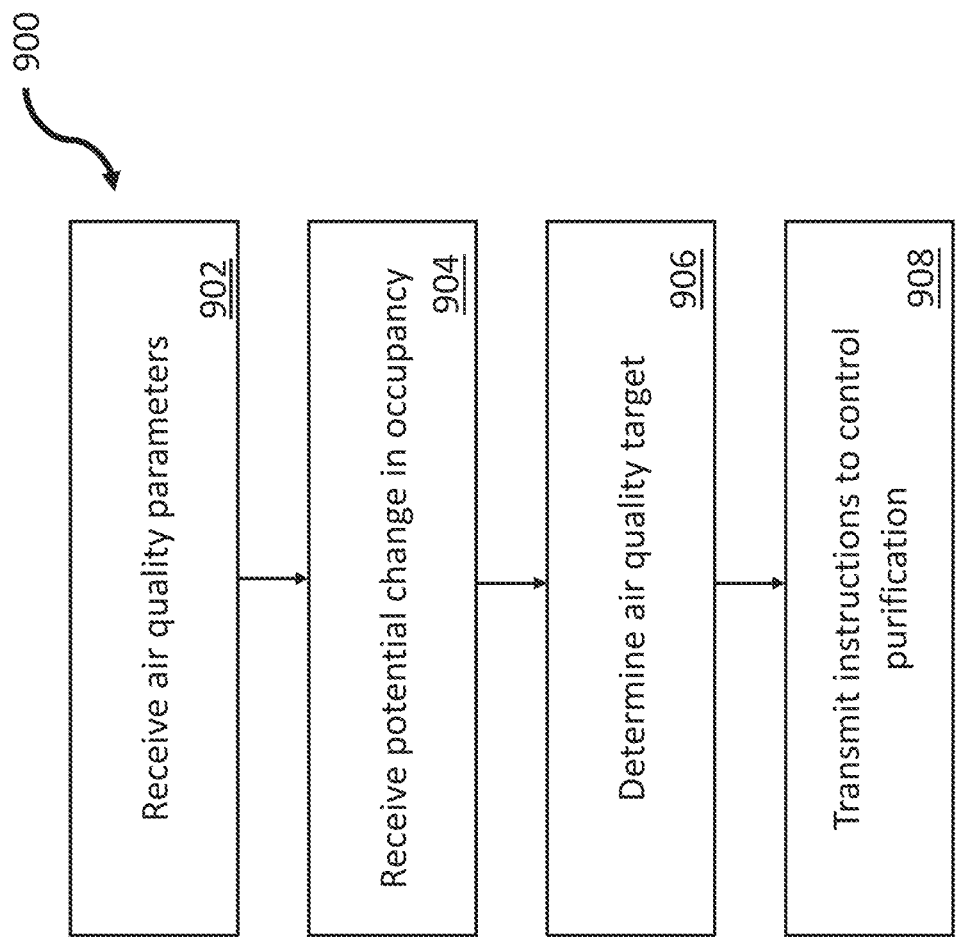
FIG. 9 is a flowchart of an exemplary variation of a method of operation of a cloud platform described in FIG. 7 and FIG. 8.

FIG. 9 is a flowchart of an exemplary variation of a method 900 of operation of a cloud platform (e.g., cloud platform 780 in FIG. 7 and/or cloud platform 880 in FIG. 8). At 920, the cloud platform can receive air quality parameters from an environment management device (e.g., from an air quality monitoring module in an environment management device) located in an environment. These air quality parameters can characterize the quality of air in the environment. For example, the air quality parameters can comprise of an amount of particulate matter, an amount of gas, temperature, humidity, pressure, a combination thereof, and/or the like in the environment. Additionally or alternatively, the cloud platform can receive an air quality score that is representative of one or more air quality parameters characterizing the quality of air in the environment.

At 940, the cloud platform can receive a potential change in occupancy in the environment. In some variations, a third-party platform (e.g., a ride-share platform) can relay the potential change in occupancy. In some variations, an occupancy sensor within the environment (e.g., in a vehicle, train car, elevator, etc.) can relay occupancy data and the cloud platform can infer a potential change based on changes in the occupancy data. In some variations, an accelerometer within an environment can relay data about the acceleration (e.g., movement of a vehicle, train car, elevator, etc.). The cloud platform can infer a potential change in occupancy based on the information from the accelerometer. Additionally or alternatively, a potential change in occupancy may be indicated based on receiving a confirmed ride request through a ride-share platform that indicates a number of passengers (e.g., explicit indication of number of passengers, an expected maximum number of passengers based on a category or type of ride-share vehicle requested, etc.

At 960, the cloud platform can determine an air quality target for the potential change in occupancy based on one or more of the air quality parameters. The air quality target represents the quality of air to be achieved in the environment. In some variations, the air quality target can be determined based on profiles generated from previous data that maps occupancy information to the quality of air in similar and/or the same environment. In some variations, the air quality target can be determined based on the ambient air quality within the environment. The ambient air quality could be representative of the outdoor air quality of the environment. Additionally or alternatively, an air quality target may be based on one or more selected air quality parameters. For example, an air quality target may be associated with an air quality profile that may be associated with a "premium" air quality profile, a "moderate" air quality profile, and/or the like, each of which may be associated varying degrees of acceptable air quality scores. As an illustrative example in which the environmental management device is associated with a vehicle that is part of a ride-share platform, the cloud platform may determine whether a future passenger of the vehicle has requested a "premium" air quality profile (e.g., which may be associated with a greater fee or fare), and in response may determine a suitable high air quality profile regardless of number of anticipated passengers.

At 980, the cloud platform can transmit instructions to one or more environment management devices to control air purification in the environment. The instructions can be based on the air quality target. In some variations, the cloud platform can transmit profiles that map quality of air to occupancy data. A controller included in the environment management device can determine the air quality target based on the profiles. In some variations, the instructions can change an intensity of air purification by the environment management device (e.g., intensity of the air purification module within the environment management device). In some variations, the instructions can vary a speed of a fan included in an air purification module within the environment management device. In some variations, the instructions can reduce a noise level of the environment management device. The timing of such instructions may, for example, be optimized for the timing of anticipated change of occupancy. For example, in variations in which the cloud platform receives an anticipated potential change in occupancy for a vehicle associated with a ride-share platform, the cloud platform can transmit instructions to one or more environment management devices to increase intensity of air purification in the vehicle for a period of time prior to the new passengers being picked up by the vehicle through the ride-share platform. As another example, in variations in which the cloud platform receives an anticipated potential change in occupancy in an elevator (e.g., based on someone requesting an elevator on a certain floor), the cloud platform can transmit instructions to one or more environment management devices to increase intensity of air purification in the elevator for a period of time prior to the new occupant entering the elevator. In some variations, once the change of occupancy has occurred (e.g., predicted based on an occupancy sensor, indicated by movement of a vehicle from a pick-up location, indicated by closing of elevator doors or movement of elevator from the floor on which the elevator was requested, etc.), intensity of air purification may be reduced to reduce environment noise, as described above.

Figure 10:
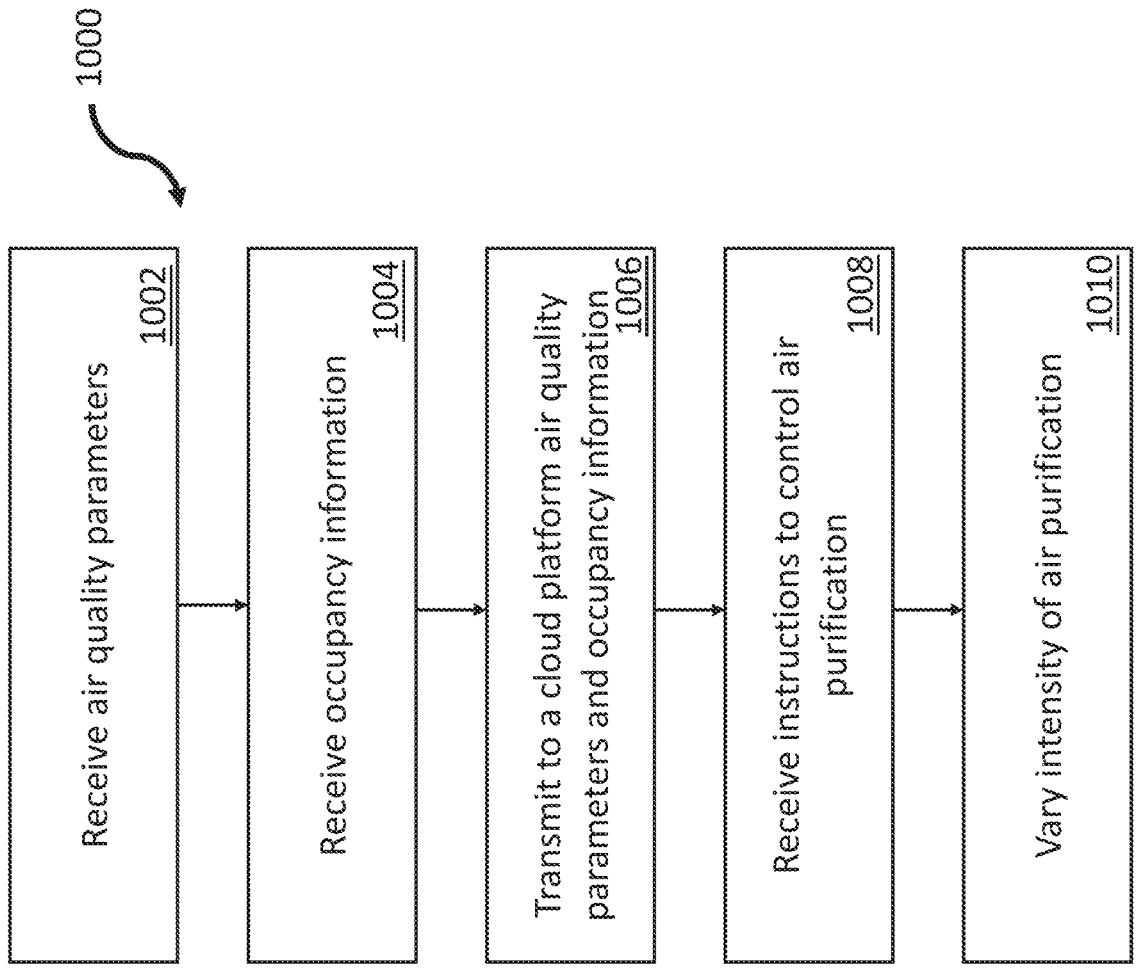
FIG. 10 is a flowchart of an exemplary variation of a method of operation of an intelligent environment monitoring and purification device.

FIG. 10 is a flowchart of an exemplary variation of a method 1000 of operation of an environment management device (e.g., environment management device 100, environment management device 200, environment management device 400, environment management device 600, and/or environment management device 700). At 1002, the environment management device can receive air quality parameters that characterize the quality of air for an environment. For example, the environment management device can receive the air quality parameters through an air quality monitoring module. The air quality parameters can comprise of an amount of particulate matter, an amount of gas, temperature, humidity, pressure, a combination thereof, and/or the like in the environment.

At 1004, the environment management device can receive occupancy information for the environment. The occupancy information can be received through an occupancy sensor that is included within the environment management device and/or through an occupancy sensor outside the environment management device but within the same environment.

At 1006, the environment management device can transmit the air quality parameters and the occupancy information to a cloud platform (e.g., cloud platform 780 in FIG. 7 and/or cloud platform 880 in FIG. 8). In some variations, the environment management device may also transmit data from an accelerometer within the environment. In some variations, the environment management device may also transmit GPS location of the environment management device.

At 1008, the environment management device can receive instructions from the cloud platform to control air purification. These instructions can be based on the air quality parameters and the occupancy information. In some variations, these instructions can be based on the GPS location and the outdoor air quality at that location. In some variations, these instructions can be based on the acceleration information attained from the accelerometer.

At 1010, the environment management device can vary the intensity of air purification based on the instructions. For instance, the environment management device can increase a speed of a fan within an air purification module to increase the intensity of air purification. Likewise, the environment management device can decrease the speed of the fan to decrease the intensity of air purification. In some variations, the environment management device can reduce the noise level of the environment management device based on the instructions.

The systems, devices, and/or methods described herein may be performed by software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) may be expressed in a variety of software languages (e.g., computer code), including C, C++, Java®, Python, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

EXAMPLE EMBODIMENTS

Embodiment 1: A method for monitoring air quality and controlling air purification in an environment, the method comprising:
  receiving, from a device located in the environment, a plurality of air quality parameters for the environment;
  receiving an indication representing a potential change in occupancy in the environment;
  in response to the indication representing the potential change in occupancy, determining, via at least one processor, an air quality target based at least in part on at least one air quality parameter in the plurality of air quality parameters and the potential change in occupancy, the air quality target being representative of the quality of air to be achieved in the environment for the potential change in occupancy; and
  transmitting instructions to control air purification in the environment based at least in part on the air quality target.

Embodiment 2. The method of embodiment 1, wherein the instructions to control air purification include instructions to change an intensity of air purification.

Embodiment 3. The method of embodiment 1, wherein transmitting instructions to control air purification comprises transmitting instructions to the device in the environment to control air purification in the environment.

Embodiment 4. The method of embodiment 1, wherein transmitting instructions to control air purification comprises transmitting instructions to an air purifier separate from the device in the environment to control air purification in the environment.

Embodiment 5. The method of embodiment 1, further comprising: receiving occupancy information for the environment and generating, via the at least one processor, a plurality of profiles for the environment, each profile in the plurality of profiles associating at least a corresponding air quality target with at least a corresponding occupancy information.

Embodiment 6. The method of embodiment 5, further comprising transmitting, to the device, the plurality of profiles for the environment.

Embodiment 7. The method of embodiment 1, wherein the instructions to control air purification include instructions to reduce a noise level of the device.

Embodiment 8. The method of embodiment 1, wherein the environment is inside of a vehicle, the method further comprising: receiving outdoor air quality information at a location of the vehicle, and transmitting instructions to control air purification, wherein the instructions include instructions to adjust the air purification based at least in part on the outdoor air quality information.

Embodiment 9. The method of embodiment 8, further comprising: receiving, via a global positioning system communicably coupled to the device, the location of the vehicle, and retrieving the outdoor air quality information at the location of the vehicle.

Embodiment 10. The method of embodiment 8, further comprising receiving the outdoor air quality information at the location of the vehicle from a second device located outside the vehicle.

Embodiment 11. The method of embodiment 8, wherein the vehicle is associated with at least one of a ride-share service and a taxicab service.

Embodiment 12. The method of embodiment 1, wherein the environment is inside of an elevator, the method further comprising: receiving, from the device, an indication that the elevator is in motion, wherein the device includes an accelerometer to identify that the elevator is in motion; and in response to the indication that the elevator is in motion, transmitting, to the device, the instructions to control air purification, wherein the instructions include instructions to reduce a noise level of the device.

Embodiment 13. The method of embodiment 1, wherein the environment is inside of an elevator, the method further comprising: receiving, from the device, occupancy information for the environment; and in response to receiving the occupancy information for the environment, transmitting, to the device, the instructions to control air purification, wherein the instructions include instructions to increase an intensity of the air purification in the environment.

Embodiment 14. The method of embodiment 13, wherein transmitting the instructions to control air purification is in response to occupancy information indicating zero occupancy in the environment.

Embodiment 15. The method of embodiment 1, wherein the plurality of air quality parameters comprises an amount of particulate matter in the environment.

Embodiment 16. The method of embodiment 1, wherein the plurality of air quality parameters comprises an amount of a gas in the environment.

Embodiment 17. The method of embodiment 1, wherein the plurality of air quality parameters comprises one or more of temperature, humidity, and pressure in the environment.

Embodiment 18. A device for monitoring and controlling air quality in an environment, the device comprising:
a housing;
at least a first sensor to generate a first sensor data comprising a plurality of air quality parameters characterizing quality of air in the environment;
a second sensor to generate a second sensor data comprising occupancy information for the environment;
a network communication module communicably coupled to the at least first sensor and the second sensor, to transmit the first sensor data and the second sensor data over a network; and
an air purification module communicably coupled to the network communication module and configured to purify air in the environment.

Embodiment 19. The device of embodiment 18, further comprising a display communicably coupled to the network communication module, configured to display an air quality score.

Embodiment 20. The device of embodiment 19, wherein the display comprises a waveguide.

Embodiment 21. The device of embodiment 20, wherein the waveguide indicates a power state of the device.

Embodiment 22. The device of embodiment 20, wherein the waveguide indicates the air quality score.

Embodiment 23. The device of embodiment 18, wherein the air purification module further comprises: a fan to pull air into the deice, at least one ionizer to charge particles in the air, and a UV light to disinfect the air.

Embodiment 24. The device of embodiment 18, further comprising a mount configured to couple the housing to a surface.

Embodiment 25. A system comprising the device of embodiment 18, the system further comprising:
a cloud platform communicably coupled to the device via the network, the cloud platform including at least one processor to:
generate an air quality target based at least in part on at least one air quality parameter in the plurality of air quality parameters and the occupancy information, and
transmit instructions to the air purification module to change an intensity of purification based at least in part on the air quality target.

Embodiment 26. The system of embodiment 25, further comprising a plurality of devices, the plurality of devices including the device and each device in the plurality of devices being communicably coupled via the network to the cloud platform.

Embodiment 27. A method for monitoring air quality and controlling air purification in an environment, the method comprising:
receiving a first sensor data comprising a plurality of air quality parameters for the environment;
receiving a second sensor data comprising occupancy information for the environment;
transmitting, to a cloud platform, the first sensor data and the second sensor data;
receiving, from the cloud platform, instructions to control air purification in the environment, wherein the instructions are based at least in part on at least one air quality parameter in the plurality of air quality parameters and the occupancy information; and
varying, an intensity of air purification based at least in part on the instructions.

Embodiment 28. The method of embodiment 27, wherein varying the intensity of air purification includes increasing a speed of a fan to increase the intensity of air purification.

Embodiment 29. The method of embodiment 27, wherein varying the intensity of air purification includes decreasing a speed of a fan to decrease the intensity of air purification.

Embodiment 30. The method of embodiment 27, wherein the environment is inside of a vehicle, the method further comprising varying the intensity of air purification based at least in part on outdoor air quality information at a location of the vehicle.

Embodiment 31. The method of embodiment 30, further comprising receiving, via a global positioning system, the location of the vehicle; and receiving, from the cloud platform, the instructions to control air purification.

Embodiment 32. The method of embodiment 31, wherein the instructions are based at least in part on associating the location of the vehicle with the outdoor air quality information.

Embodiment 33. The method of embodiment 30, further comprising receiving the outdoor air quality information at the location of the vehicle from a second device located outside the vehicle.

Embodiment 34. The method of embodiment 27, wherein the environment is inside of an elevator, the method further comprising receiving, via an accelerometer, an indication that the elevator is in motion; and in response to the indication that the elevator is in motion, decreasing, the intensity of air purification.

Embodiment 35. The method of embodiment 34, wherein decreasing the intensity of air purification reduces noise level in the elevator.

Embodiment 36. The method of embodiment 27, wherein the environment is inside of an elevator, the method further comprising: in response to receiving the second sensor data, increasing the intensity of air purification, wherein the second sensor data comprising the occupancy information indicates zero occupancy in the environment.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention.

The invention claimed is:

1. A method for monitoring air quality and controlling air purification in an enclosed indoor transportation environment via an environment management device, the environment management device comprising a controller communicatively coupled to an air purification module and a communication module, the method comprising:

receiving, from a sensor located in the enclosed indoor transportation environment, a plurality of air quality parameters for the enclosed indoor transportation environment, wherein the enclosed indoor transportation environment is configured to move through an ambient air environment surrounding the enclosed indoor transportation environment;

receiving an indication representing a potential change in occupancy in the enclosed indoor transportation environment; in response to the indication representing the potential change in occupancy, determining, via at least one processor, an air quality target based at least in part on at least one air quality parameter in the plurality of air quality parameters and the potential change in occupancy, the air quality target being representative of the quality of air to be achieved in the enclosed indoor transportation environment for the potential change in occupancy;

transmitting instructions to control air purification in the enclosed indoor transportation environment based at least in part on the air quality target;

receiving, from the sensor, occupancy information for the enclosed indoor transportation environment;

generating, via the at least one processor, a plurality of profiles for the enclosed indoor transportation environment, each profile in the plurality of profiles associating at least a corresponding air quality target with at least a corresponding occupancy information;

transmitting, to an environment management device, the plurality of profiles for the enclosed indoor transportation environment; and in response to receiving the occupancy information for the enclosed indoor transportation environment and received enclosed indoor transportation environment location information, transmitting to the environment management device instructions to control air purification, wherein the instructions include instructions to increase an intensity of the air purification in the enclosed indoor transportation environment.

2. The method of claim 1, wherein the instructions to control air purification include instructions to change an intensity of air purification.

3. The method of claim 1, wherein transmitting instructions to control air purification comprises transmitting instructions to the environment management device in the enclosed indoor transportation environment to control air purification in the enclosed indoor transportation environment.

4. The method of claim 1, wherein transmitting instructions to control air purification comprises transmitting instructions to an air purifier separate from the sensor in the enclosed indoor transportation environment to control air purification in the enclosed indoor transportation environment.

5. The method of claim 1, wherein the instructions to control air purification include instructions to reduce a noise level of the environment management device.

6. The method of claim 1, wherein the enclosed indoor transportation environment is inside of a vehicle, the method further comprising:

receiving outdoor air quality information at a location of the vehicle; and transmitting instructions to control air purification, wherein the instructions include instructions to adjust the air purification based at least in part on the outdoor air quality information.

7. The method of claim 6, further comprising:

receiving, via a global positioning system communicably coupled to the sensor, the location of the vehicle; and retrieving the outdoor air quality information at the location of the vehicle.

8. The method of claim 6, further comprising receiving the outdoor air quality information at the location of the vehicle from a second sensor located outside the vehicle.

9. The method of claim 6, wherein the vehicle is associated with at least one of a ride-share service and a taxicab service.

10. The method of claim 1 further comprising:
receiving, from the sensor, an indication that the enclosed indoor transportation environment is in motion, wherein the sensor includes an accelerometer to identify that the enclosed indoor transportation environment is in motion; and
in response to the indication that the enclosed indoor transportation environment is in motion, transmitting, to the sensor, the instructions to control air purification, wherein the instructions include instructions to reduce a noise level of the environment management device.

11. The method of claim 1, wherein transmitting the instructions to control air purification is in response to occupancy information indicating zero occupancy in the enclosed indoor transportation environment.

12. The method of claim 1, wherein the plurality of air quality parameters comprises an amount of particulate matter in the enclosed indoor transportation environment.

13. The method of claim 1, wherein the plurality of air quality parameters comprises an amount of a gas in the enclosed indoor transportation environment.

14. The method of claim 1, wherein the plurality of air quality parameters comprises one or more of temperature, humidity, and pressure in the enclosed indoor transportation environment.

15. The method of claim 1, wherein the enclosed indoor transportation environment is one of a vehicle, car, train, bus, watercraft, aircraft, spacecraft and elevator.

16. A method for monitoring air quality and controlling air purification in an enclosed indoor transportation environment via an environment management device, the environment management device comprising a controller communicatively coupled to an air purification module and a communication module, the method comprising:
receiving, from a sensor located in the enclosed indoor transportation environment, a plurality of air quality parameters for the enclosed indoor transportation environment, wherein the enclosed indoor transportation environment is configured to move through an ambient air environment surrounding the enclosed indoor transportation environment;
receiving an indication representing a potential change in occupancy in the enclosed indoor transportation environment; in response to the indication representing the potential change in occupancy, determining, via at least one processor, an air quality target based at least in part on at least one air quality parameter in the plurality of air quality parameters and the potential change in occupancy, the air quality target being representative of the quality of air to be achieved in the enclosed indoor transportation environment for the potential change in occupancy;
transmitting instructions to control air purification in the enclosed indoor transportation environment based at least in part on the air quality target;
receiving, from the sensor, an indication that the enclosed indoor transportation environment is in motion, wherein the sensor includes an accelerometer to identify that the enclosed indoor transportation environment is in motion; and
in response to the indication that the enclosed indoor transportation environment is in motion and received enclosed indoor transportation environment location information, transmitting, to the sensor, the instructions to control air purification, wherein the instructions include instructions to reduce a noise level of the environment management device.

17. The method of claim 16, wherein the enclosed indoor transportation environment is one of a vehicle, car, train, bus, watercraft, aircraft, spacecraft and elevator.

* * * * *